United States Patent
Fan et al.

(10) Patent No.: US 10,995,383 B2
(45) Date of Patent: *May 4, 2021

(54) METHOD FOR PRODUCING A HIGH STRENGTH COATED STEEL SHEET HAVING IMPROVED STRENGTH AND DUCTILITY AND OBTAINED SHEET

(71) Applicant: ArcelorMittal, Luxembourg (LU)

(72) Inventors: Dongwei Fan, Munster, IN (US); Hyun Jo Jun, Clinton, NJ (US); Rashmi Ranjan Mohanty, East Chicago, IN (US)

(73) Assignee: ARCELORMITTAL, Luxembourg (LU)

( * ) Notice: Subject to any disclaimer, the term of this patent is extended or adjusted under 35 U.S.C. 154(b) by 0 days.

This patent is subject to a terminal disclaimer.

(21) Appl. No.: 15/322,722

(22) PCT Filed: Jul. 3, 2015

(86) PCT No.: PCT/IB2015/055035
§ 371 (c)(1),
(2) Date: Dec. 28, 2016

(87) PCT Pub. No.: WO2016/001891
PCT Pub. Date: Jan. 7, 2016

(65) Prior Publication Data
US 2017/0130290 A1    May 11, 2017

(30) Foreign Application Priority Data
Jul. 3, 2014    (WO) .................. PCT/IB2014/003249

(51) Int. Cl.
*C21D 9/46*    (2006.01)
*C21D 6/00*    (2006.01)
(Continued)

(52) U.S. Cl.
CPC .............. *C21D 9/46* (2013.01); *B32B 15/013* (2013.01); *C21D 1/19* (2013.01); *C21D 6/005* (2013.01);
(Continued)

(58) Field of Classification Search
CPC . C21D 1/18; C21D 1/185; C21D 1/19; C21D 1/20; C21D 1/22; C21D 1/25;
(Continued)

(56) References Cited

U.S. PATENT DOCUMENTS

| 4,159,218 A | * | 6/1979 | Chatfield | ............... C21D 1/185 148/333 |
| 8,697,252 B2 | | 4/2014 | Irie et al. | |

(Continued)

FOREIGN PATENT DOCUMENTS

| CN | 101225499 A | 7/2008 |
| CN | 101351570 A | 1/2009 |

(Continued)

OTHER PUBLICATIONS

Ning Zhong et al., "Microstructural Evolution of a Medium Carbon Advanced High Strength Steel Heat-Treated by Quenching-Partitioning Process", Aug. 16, 2013, John Wiley & Sons, Inc., Hoboken, NJ, USA, XP055166044, ISBN: 978-0-47-094309-0, pp. 885-889.

(Continued)

*Primary Examiner* — Vanessa T. Luk

(57) ABSTRACT

A method for producing a high strength coated steel sheet having a yield strength YS of at least 800 MPa, a tensile strength TS of >1180 MPa, a total elongation >14% and a hole expansion ratio HER >30%. The steel contains in weight %: $0.13\% \leq C \leq 0.22\%$, $1.2\% \leq Si \leq 1.8\%$, $1.8\% \leq Mn \leq 2.2\%$, $0.10\% \leq Mo \leq 0.20\%$, $Nb \leq 0.05\%$, $Al \leq 0.5\%$, the remainder being Fe and unavoidable impurities. The (Continued)

sheet is annealed at a temperature TA higher than $Ac_3$ but less than 1000° C. for more than 30 s, then quenched by cooling temperature QT between 325° C. and 375° C., at a cooling speed sufficient to obtain a structure consisting of austenite and at least 60% of martensite, the austenite content being such that the final structure can contain between 3% and 15% of residual austenite and between 85 and 97% of the sum of martensite and bainite, without ferrite, then heated to a partitioning temperature PT between 430° C. and 480° C. and maintained at this temperature for a partitioning time Pt between 10 s and 90 s, then hot dip coated cooled to the room temperature. Coated sheet obtained.

10 Claims, 1 Drawing Sheet

(51) Int. Cl.

| | |
|---|---|
| *C23C 2/06* | (2006.01) |
| *C21D 8/04* | (2006.01) |
| *C21D 8/02* | (2006.01) |
| *C21D 1/19* | (2006.01) |
| *B32B 15/01* | (2006.01) |
| *C22C 38/02* | (2006.01) |
| *C22C 38/04* | (2006.01) |
| *C22C 38/06* | (2006.01) |
| *C22C 38/12* | (2006.01) |
| *C22C 38/14* | (2006.01) |
| *C23C 2/02* | (2006.01) |
| *C23C 2/28* | (2006.01) |
| *C23C 2/40* | (2006.01) |

(52) U.S. Cl.
CPC ............ *C21D 6/008* (2013.01); *C21D 8/0247* (2013.01); *C21D 8/0447* (2013.01); *C22C 38/02* (2013.01); *C22C 38/04* (2013.01); *C22C 38/06* (2013.01); *C22C 38/12* (2013.01); *C22C 38/14* (2013.01); *C23C 2/02* (2013.01); *C23C 2/06* (2013.01); *C23C 2/28* (2013.01); *C23C 2/40* (2013.01); *C21D 8/0484* (2013.01); *C21D 2211/001* (2013.01); *C21D 2211/002* (2013.01); *C21D 2211/008* (2013.01)

(58) Field of Classification Search
CPC ... C21D 1/26; C21D 1/28; C21D 1/30; C21D 1/32; C21D 6/005; C21D 6/008; C21D 8/005; C21D 8/02; C21D 8/0205; C21D 8/0247; C21D 8/0405; C21D 8/0447; C21D 9/46; C21D 9/48; C21D 2211/001; C21D 2211/002; C21D 2211/008
See application file for complete search history.

(56) References Cited

U.S. PATENT DOCUMENTS

| | | | |
|---|---|---|---|
| 9,290,834 B2 | 3/2016 | Hasegawa et al. | |
| 9,856,548 B2 | 1/2018 | Allain et al. | |
| 10,190,186 B2 | 1/2019 | Hasegawa et al. | |
| 2003/0111145 A1* | 6/2003 | Kusinski | C22C 38/18 148/622 |
| 2006/0011274 A1 | 1/2006 | Speer et al. | |
| 2008/0251161 A1 | 10/2008 | Kashima et al. | |
| 2009/0065103 A1 | 3/2009 | Sippola | |
| 2009/0238713 A1 | 9/2009 | Kinugasa et al. | |
| 2010/0221138 A1 | 9/2010 | Nakaya et al. | |
| 2010/0221573 A1 | 9/2010 | Drillet et al. | |
| 2010/0263773 A1* | 10/2010 | Cho | C22C 38/02 148/645 |
| 2010/0273024 A1 | 10/2010 | Bocharova et al. | |
| 2011/0198002 A1* | 8/2011 | Nakagaito | C22C 38/02 148/533 |
| 2011/0220252 A1 | 9/2011 | Hammer et al. | |
| 2014/0170439 A1 | 6/2014 | Allain et al. | |
| 2014/0234655 A1 | 8/2014 | Takashima et al. | |
| 2014/0322559 A1 | 10/2014 | Becker et al. | |
| 2014/0377584 A1* | 12/2014 | Hasegawa | C23C 2/06 428/659 |
| 2015/0101712 A1* | 4/2015 | Futamura | C21D 9/46 148/518 |
| 2015/0203947 A1 | 7/2015 | Hasegawa et al. | |
| 2016/0355900 A1 | 12/2016 | Gil Olin et al. | |
| 2017/0130292 A1 | 5/2017 | Mohanty et al. | |
| 2017/0137907 A1 | 5/2017 | Mohanty et al. | |
| 2017/0152579 A1 | 6/2017 | Mohanty et al. | |

FOREIGN PATENT DOCUMENTS

| | | | | |
|---|---|---|---|---|
| CN | 101437975 A | 5/2009 | | |
| CN | 101802233 A | 8/2010 | | |
| CN | 101802237 A | 8/2010 | | |
| EP | 1707645 A1 | 10/2006 | | |
| EP | 1724371 A1 | 11/2006 | | |
| EP | 2202327 A1 | 6/2010 | | |
| EP | 2267176 A1 | 10/2010 | | |
| EP | 2267176 A1 | 12/2010 | | |
| EP | 2325346 A1 | 5/2011 | | |
| EP | 2436794 A1 | 4/2012 | | |
| EP | 2524970 A1 | 11/2012 | | |
| EP | 2881481 A1 | 6/2015 | | |
| GB | 2439069 A | 12/2007 | | |
| JP | 2003013177 A | 1/2003 | | |
| JP | 2006083403 A | 3/2006 | | |
| JP | 2007197819 A | 8/2007 | | |
| JP | 2008038247 A | 2/2008 | | |
| JP | 2009173959 A | 8/2009 | | |
| JP | 5315956 B2 | 6/2010 | | |
| JP | 2010126770 A | 6/2010 | | |
| JP | 2010126770 A * | 6/2010 | | |
| JP | 2012021225 A | 2/2012 | | |
| JP | 2012031462 A | 2/2012 | | |
| JP | 2012229466 A | 11/2012 | | |
| JP | 2012240095 A | 12/2012 | | |
| JP | 2013040383 A | 2/2013 | | |
| JP | 2013237923 A | 11/2013 | | |
| JP | 2014019928 A | 2/2014 | | |
| JP | 2014034716 A | 2/2014 | | |
| RU | 2474623 C1 | 2/2011 | | |
| RU | 2518852 C1 | 6/2014 | | |
| WO | 2012120020 A1 | 9/2012 | | |
| WO | WO-2012156428 A1 * | 11/2012 | ............... | C21D 1/19 |
| WO | WO-2013051160 A1 * | 4/2013 | ............ | C22C 38/005 |
| WO | WO-2013146087 A1 * | 10/2013 | ............... | C21D 9/46 |

OTHER PUBLICATIONS

De Moore E et al., "Quench and Partitioning Response of a Mo-alloyed CMnSi Steel", New Developments on Metallurgy and Applications of High Strength Steels: Buenos Aires 2008; International Conference, May 28-28, Buenos Aires, Argentina, vol. 2, May 26, 2008, pp. 721-730.

Edmonds D V et al: "Quenching and partitioning martensite—A novel steel heat treatment", Material Science and Engineering A: Structural Materials: Properties, Microstructure & Processing, Lausanne, CH, vol. 438-440, Nov. 25, 2006, pp. 25-34.

Thomas G et al: "Alloy design for fundamental study of quenched and partitioned steels", Materials Science & Technology Conference & Exhibition, Colombus, OH, United States,Oct. 16, 2011, pp. 552-567.

De Moore et al.: "Quench and Partitioning response of a Mo-alloyed CMnSi Steel", New Developments on Metallurgy and Applications of High Strength Steels: Buenos Aires 2008; International Conference, May 26-28, Hilton Hotel,Buenos Aires, Argentina, vol. 2, May 26, 2008, pp. 721-730.

(56) References Cited

OTHER PUBLICATIONS

U.S. Appl. No. 15/322,712, filed Dec. 28, 2016, published as U.S. 2017/0137907A1 on May 18, 2017.
U.S. Appl. No. 15/322,947, filed Dec. 29, 2016, published as U.S. 2017/0130292A1 on May 11, 2017.
U.S. Appl. No. 15/322,829, filed Dec. 29, 2016, published as US 2017/0152579A1 on Mar. 11, 2017.
Morsdorf, L., et al., "Multiple Mechanisms of Lath Martensite Plasticity." Acta Materialia, vol. 121, 2016, pp. 202-214 (Year: 2016).
Ji, Mo et al., "Effect of Grain Size Distribution on Recrystallisation Kinetics in an Fe—30Ni Model Alloy." Metals, vol. 9, No. 3, 2019, p. 369 (Year: 2019).
L. Wang et al., "Quenching and Partitioning Steel Heat Treatment," Metallogr. Microstruct. Anal. (2013), 2, pp. 268-281.
J. G. Speer et al., "Progress in the Global Development of the Quenching and Partitioning Process," Jpn. Soc. Heat. Treat. (Special Issue: Proceedings of the 17th IFHTSE Congress) 2008, 49, pp. 415-422.
E. De Moor, "Assessment of Quenching and Partitioning as a Fundamentally New Way of Producing Advanced High Strength Martensitic Steel Grades with Improved Ductility", Doctoral Thesis, University of Ghent, Jan. 2009.
K. W. Andrews, "Empirical Formulea for the calculation of some transformation temperatures," Journal of the Iron and Steel Institute, Jul. 1965, pp. 721-727.
Opposition to European Patent 3 164 512 (15750461.4) and English translation thereof, filed Jun. 12, 2019.
Bagliani et al., "Microstructure, Tensile and Toughness Properties after Quenching and Partitioning Treatments of a Medium-Carbon Steel." Materials Science and Engineering: A, vol. 559, 2013, pp. 486-495.

\* cited by examiner

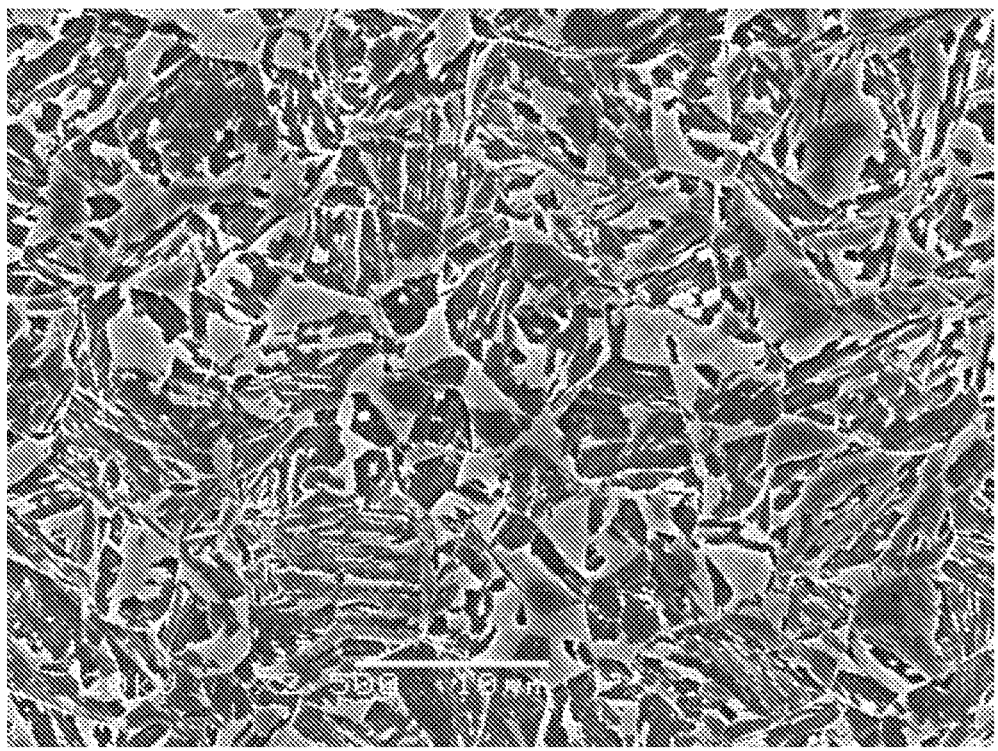

METHOD FOR PRODUCING A HIGH STRENGTH COATED STEEL SHEET HAVING IMPROVED STRENGTH AND DUCTILITY AND OBTAINED SHEET

The present invention relates to a method for producing a high strength coated steel sheet having improved strength, ductility and formability and to the sheets obtained with the method.

To manufacture various equipments such as parts of body structural members and body panels for automotive vehicles, it is usual to use galvanized or galvannealed sheets made of DP (dual phase) steels or TRIP (transformation induced plasticity) steels.

For example, such steels which include a martensitic structure and/or some retained austenite and which contains about 0.2% of C, about 2% of Mn, about 1.7% of Si have a yield strength of about 750 MPa, a tensile strength of about 980 MPa, a total elongation of more than 8%. These sheets are produced on continuous annealing line by quenching from an annealing temperature higher than $Ac_3$ transformation point, down to an overaging temperature above Ms Transformation point and maintaining the sheet at the temperature for a given time. Then the sheet is galvanized or galvannealed.

To reduce the weight of the automotive in order to improve their fuel efficiency in view of the global environmental conservation it is desirable to have sheets having improved yield and tensile strength. But such sheets must also have a good ductility and a good formability and more specifically a good stretch flangeability.

In this respect, it is desirable to have sheets having a yield strength YS of at least 800 MPa, a tensile strength TS of about 1180 MPa, a total elongation of at least 14% and a hole expansion ratio HER according to ISO standard 16630:2009 of more than 25%. It must be emphasized that, due to differences in the methods of measure, the values of hole expansion ration HER according to the ISO standard are very different and not comparable to the values of the hole expansion ratio A according to the JFS T 1001 (Japan Iron and Steel Federation standard).

Therefore, the purpose of the present invention is to provide such sheet and a method to produce it.

For this purpose, the invention relates to a method for producing a high strength coated steel sheet having an improved strength and an improved formability, the sheet having a yield strength YS of at least 800 MPa, a tensile strength TS of at least 1180 MPa, a total elongation of at least 14% and a hole expansion ratio HER of at least 30%, by heat treating and coating a steel sheet whose chemical composition of the steel contains in weight %:

0.13%≤C≤0.22%
1.2%≤Si≤1.8%
1.8%≤Mn≤2.2%
0.10%≤Mo≤0.20%
Nb≤0.05%
Al≤0.5% the remainder being Fe and unavoidable impurities. The heat treatment and the coating comprise the following steps:
annealing the sheet at an annealing temperature TA higher than $Ac_3$ but less than 1000° C. for a time of more than 30 s,
quenching the sheet by cooling it down to a quenching temperature QT between 325° C. and 375° C., at a cooling speed sufficient to obtain a structure consisting of austenite and at least 60% of martensite, the austenite content being such that the final structure i.e. after treatment, coating and cooling to the room temperature, can contain between 3% and 15% of residual austenite and between 85% and 97% of the sum of martensite and bainite, without ferrite
heating the sheet up to a partitioning temperature PT between 430° C. and 480° C. and maintaining the sheet at this temperature for a partitioning time Pt between 10 s and 90 s,
hot dip coatings the sheet and,
cooling the sheet down to the room temperature.

Preferably, the quenching temperature QT is between 350° C. and 375° C.

Preferably, the partitioning temperature PT is between 435° C. and 465° C.

The chemical composition of the steel can satisfy at least one of the following conditions:
0.16%≤C≤0.20%
1.3%≤Si≤1.6%
and
1.9%≤Mn≤2.1%

The hot dip coating step may be a galvanizing step.
The hot dip coating step may be a galvannealing step with an alloying temperature TGA between 480° C. and 510° C. In this case, the partitioning time PT is preferably between 50 s and 70 s.

Preferably, after the sheet is quenched to the quenching temperature QT and before the sheet is heated to the partitioning temperature PT, the sheet is held at the quenching temperature QT for a holding time comprised between 2 s and 8 s, preferably between 3 s and 7 s.

The invention, also, relates to a coated steel sheet whose chemical composition of the steel contains in weight %:
0.13%≤C≤0.22%
1.2%≤Si≤1.8%
1.8%≤Mn≤2.2%
0.10%≤Mo≤0.20%
Nb≤0.05%
Al≤0.5%
Ti≤0.05% the remainder being Fe and unavoidable impurities. The structure of the steel consists of 3% to 15% of residual austenite and 85% to 97% of martensite and bainite, without ferrite. At least one face of the sheet comprises a metallic coating. The sheet has a yield strength of at least 800 MPa, a tensile strength of at least 1180 MPa, a total elongation of at least 14% and a hole expansion ratio HER of at least 30%.

Optionally the chemical composition of the steel can satisfy at least one of the following conditions:
0.16%≤C≤0.20%
1.3%≤Si≤1.6%
and
1.9%≤Mn≤2.1%

The at least one coated face is, for example, galvanized.
The at least one coated face is, for example, galvannealed.

The invention will now be described in details but without introducing limitations and illustrated by the FIGURE which is a micrograph of an example of the invention.

According to the invention, the sheet is obtained by hot rolling and optionally cold rolling of a semi product which chemical composition contains, in weight %:
0.13% to 0.22%, and preferably more than 0.16% preferably less than 0.20% of carbon for ensuring a satisfactory strength and improving the stability of the retained austenite which is necessary to obtain a sufficient elongation. If carbon content is too high, the hot rolled sheet is too hard to cold roll and the weldability is insufficient.

1.2% to 1.8%, preferably more than 1.3% and less than 1.6% of silicon in order to stabilize the austenite, to provide a solid solution strengthening and to delay the formation of carbides during overaging without formation of silicon oxides at the surface of the sheet which is detrimental to coatability.

1.8% to 2.2% and preferably more than 1.9% and preferably less than 2.1% of manganese to have a sufficient hardenability in order to obtain a structure containing at least 65% of martensite, tensile strength of more than 1150 MPa and to avoid having segregation issues which are detrimental for the ductility.

0.10% to 0.20% of molybdenium to increase the hardenability and to stabilize the retained austenitic in order to strongly reduce austenite decomposition during overaging.

up to 0.5% of aluminium which is usually added to liquid steel for the purpose of deoxidation, preferably, the Al content is limited to 0.05%. If the content of Al is above 0.5%, the austenitizing temperature will be too high to be easily reached and the steel will become industrially difficult to process.

Nb content and Ti content are limited to 0.05% each because above such values numerous precipitates will form and formability will decrease, making the 14% of total elongation more difficult to reach.

The remainder being iron and residual elements resulting from the steelmaking. In this respect, Ni, Cr, Cu, V, B, S, P and N at least are considered as residual elements which are unavoidable impurities. Therefore, generally, their contents are less than 0.05% for Ni, 0.10% for Cr, 0.03 for Cu, 0.007% for V, 0.0010% for B, 0.005% for S, 0.02% for P and 0.010% for N.

The sheet is prepared by hot rolling and optionally cold rolling according to the methods known by those who are skilled in the art.

After rolling the sheets are pickled or cleaned then heat treated and hot dip coated.

The heat treatment which is made preferably on a combined continuous annealing and hot dip coating line comprises the steps of:

annealing the sheet at an annealing temperature TA higher than the $Ac_3$ transformation point of the steel, and preferably higher than $Ac_3+15°$ C., in order to be sure that the structure is completely austenitic, but less than 1000° C. in order not to coarsen too much the austenitic grains. Generally, a temperature higher than 865° C. is enough for the steel according to the invention. The sheet is maintained at the annealing temperature i.e. maintained between TA−5° C. and TA+10° C., for a time sufficient to homogenize the chemical composition. Preferably, the time is of more than 30 s but does not need to be of more than 300 s.

quenching the sheet by cooling down to a quenching temperature QT lower than the Ms transformation point at a cooling rate enough to avoid ferrite and bainite formation. The quenching temperature is between 325° C. and 375° C. and preferably between 350° C. and 375° C. in order to have, just after quenching, a structure consisting of austenite and at least 60% of martensite, the austenite content being such that the final structure i.e. after treatment, coating and cooling to the room temperature, can contain between 3% and 15% of residual austenite and between 85 and 97% of the sum of martensite and bainite, without ferrite. A cooling rate higher than 30° C./s is enough, reheating the sheet up to a partitioning temperature PT between 430° C. and 480° C. and preferably between 435° C. and 465° C. For example, the partitioning temperature can be equal to the temperature at which the sheet must be heated in order to be hot dip coated, i.e. between 455° C. and 465° C. The reheating rate can be high when the reheating is made by induction heater, but that reheating rate had no apparent effect on the final properties of the sheet. Preferably, between the quenching step and the step of reheating the sheet to the partitioning temperature PT, the sheet is held at the quenching temperature for a holding time comprised between 2 s and 8 s, preferably between 3 s and 7 s.

maintaining the sheet at the partitioning temperature PT for a partitioning time Pt between 10 s and 90 s. Maintaining the sheet at the partitioning temperature means that during partitioning the temperature of the sheet remains between PT−20° C. and PT+20° C.

optionally, adjusting the temperature of the sheet by cooling or heating in order to be equal to the temperature at which the sheet has to be heated in order to be hot dip coated.

hot dip coating the sheet, the hot dip coating being, for example, galvanizing or galvannealing, but all type of metallic hot dip coating is possible provided that the temperatures at which the sheet is brought to during coating remains less than 650° C. When the sheet is galvanized, it is done with the usual conditions. When the sheet is galvannealed, the temperature of alloying TGA must not be too high to obtain good final mechanical properties. This temperature is preferably between 480° C. and 510° C. Moreover, in this case, the partitioning time is preferably between 50 s and 70 s.

generally, after coating, the sheet is processed according to the known art. In particular the sheet is cooled to the room temperature.

With such treatment, coated sheets having a yield strength YS of at least 800 MPa, a tensile strength of at least 1180 MPa, a total elongation of at least 14% and a hole expansion ratio HER according to the ISO standard 16630:2009 of at least 30% can be obtained.

As an example a sheet of 1.2 mm in thickness having the following composition: C=0.18%, Si=1.5% Mn=2.0%, Nb=0.02%, Mo=0.15%, the remainder being Fe and impurities, was manufactured by hot and cold rolling. The theoretical Ms transformation point of this steel is 386° C. and the $Ac_3$ point is 849° C.

Samples of the sheet were heat treated by annealing, quenching and partitioning then galvanized or galvannealed, and the mechanical properties were measured.

The conditions of treatment and the obtained properties are reported at table I for the samples that were galvanized and at table II for the samples that were galvannealed.

TABLE I

| Sample | TA °C. | QT °C. | PT °C. | Pt s | YS MPa | TS MPa | UE % | TE % | HER % |
|---|---|---|---|---|---|---|---|---|---|
| 1 | 900 | 300 | 460 | 60 | 1116 | 1207 | 7 | 12 | |
| 2 | 900 | 350 | 460 | 30 | 952 | 1215 | 9 | 14 | |
| 3 | 900 | 350 | 460 | 60 | 926 | 1199 | 8 | 14 | 31 |
| 4 | 900 | 350 | 460 | 90 | 909 | 1207 | 9 | 14 | |
| 5 | 900 | 400 | 460 | 60 | 709 | 1187 | 10 | 15 | |
| 6 | 900 | 460 | 460 | 60 | 685 | 1178 | 9 | 14 | |

TABLE II

| Sample | TA °C. | QT °C. | PT °C. | Pt s | TGA °C. | YS MPa | TS MPa | UE % | TE % | HER % |
|---|---|---|---|---|---|---|---|---|---|---|
| 7 | 900 | 350 | 460 | 60 | 500 | 838 | 1185 | 9 | 14 | 34 |
| 8 | 900 | 350 | 460 | 60 | 520 | 854 | 1215 | 9 | 12 | |
| 9 | 900 | 350 | 460 | 60 | 520 -20 s- | 869 | 1167 | 8 | 12 | |
| 10 | 900 | 350 | 460 | 60 | 570 | 898 | 1106 | 7 | 13 | |

In these tables, TA is the annealing temperature, QT the quenching temperature, PT the partitioning temperature, Pt the maintaining time at the partitioning temperature, TGA the temperature of alloying for the sheets that were galvannealed, YS the yield strength, TS the tensile strength, UE the uniform elongation, TE the total elongation and HER the hole expansion ratio measured according to the ISO 16630: 2009 standard.

For example 9, "520-20" (TGA) means that the steel has been at the GA temperature of 520° C. for 20 seconds, in the other examples (7, 8 and 10) once the GA temperature is reached, then the temperature decreases slowly before the final cooling.

Examples 1 to 4 show that with a quenching temperature equal or less than 350° C., a partitioning at a temperature of 460° C. with a partitioning time from 30 s to 90 s galvanized sheets have a yield strength higher than 800 MPa, a tensile strength higher than 1180 MPa, a total elongation of more than or equal to 12% and a hole expansion ratio measured according to ISO standard 16630: 2009 higher than 30%.

Examples for which the quenching temperature is higher than Ms are comparative examples and/or according to the prior art. The structure contains ferrite or bainite and austenite and the yield strength is significantly less than 800 MPa.

The examples 7 to 10 show that, when the sheet is galvannealed, the temperature of alloying has to be as low as possible to obtain a total elongation of 14% and a hole expansion ratio HER of more than 30%. Example 7, a micrograph of which is shown at the FIGURE, contains 4% of retained austenite and 96% of the sum of martensite and bainite.

The conditions of treatment and the obtained properties are reported at table I for the samples that were galvanized and at table II for the samples that were galvannealed.

The invention claimed is:

1. A method for producing a high strength coated steel sheet having an improved strength and an improved formability, the coated steel sheet having a yield strength YS of at least 800 MPa, a tensile strength TS of at least 1180 MPa, a total elongation of at least 14% and a hole expansion ratio HER of at least 30%, comprising the steps of:
   providing a steel sheet having a chemical composition including in weight %:
   $0.13\% \leq C \leq 0.22\%$;
   $1.2\% \leq Si \leq 1.8\%$;
   $1.8\% \leq Mn \leq 2.2\%$;
   $0.10\% \leq Mo \leq 0.20\%$;
   $Nb \leq 0.05\%$;
   $Al \leq 0.5\%$;
   $Ti \leq 0.05\%$; and
   a remainder being Fe and unavoidable impurities;
   annealing the sheet at an annealing temperature TA higher than $Ac_3$ but less than 1000° C. for a time of more than 30 s;
   quenching the sheet by cooling the sheet down to a quenching temperature QT between 325° C. and 375° C. at a cooling speed higher than 30° C./s in order to obtain a structure consisting of austenite and at least 60% of martensite, with an austenite content such that the coated steel sheet has a final structure after coating and cooling to room temperature, including between, by volume fraction, 3% and 15% of residual austenite and between 85% and 97% of a sum of martensite and bainite, the final structure including at least 65% of martensite, the final structure not including ferrite;
   holding the sheet at the quenching temperature QT for a holding time between 2 s and 8 s;
   heating the sheet up to a partitioning temperature PT between 430° C. and 480° C. and maintaining the sheet at the partitioning temperature PT for a partitioning time Pt between 10 s and 90 s;
   hot dip coating the sheet; and
   cooling the sheet down to room temperature.

2. The method according to claim 1, wherein the quenching temperature QT is between 350° C. and 375° C.

3. The method according to claim 2, wherein the partitioning temperature is between 435° C. and 465° C.

4. The method according to claim 1, wherein the partitioning temperature PT is between 435° C. and 465° C.

5. The method according to claim 1, wherein the chemical composition of the steel satisfies at least one of the following conditions:
   $0.16\% \leq C \leq 0.20\%$;
   $1.3\% \leq Si \leq 1.6\%$; and
   $1.9\% \leq Mn \leq 2.1\%$.

6. The method according to claim 1, wherein the hot dip coating is a galvanizing step.

7. The method according to claim 1, wherein the hot dip coating step is a galvannealing step with an alloying temperature TGA between 480° C. and 510° C.

8. The method according to claim 7, wherein the partitioning time Pt is between 50 s and 70 s.

9. The method according to claim 1, wherein the holding time at the quenching temperature is between 3 s and 7 s.

10. The method according to claim 1, wherein the partitioning time is between 10 s and 30 s.

* * * * *